Sept. 19, 1939.  A. R. AMES  2,173,619
TIRE INFLATING AND TESTING EQUIPMENT
Filed Feb. 8, 1937
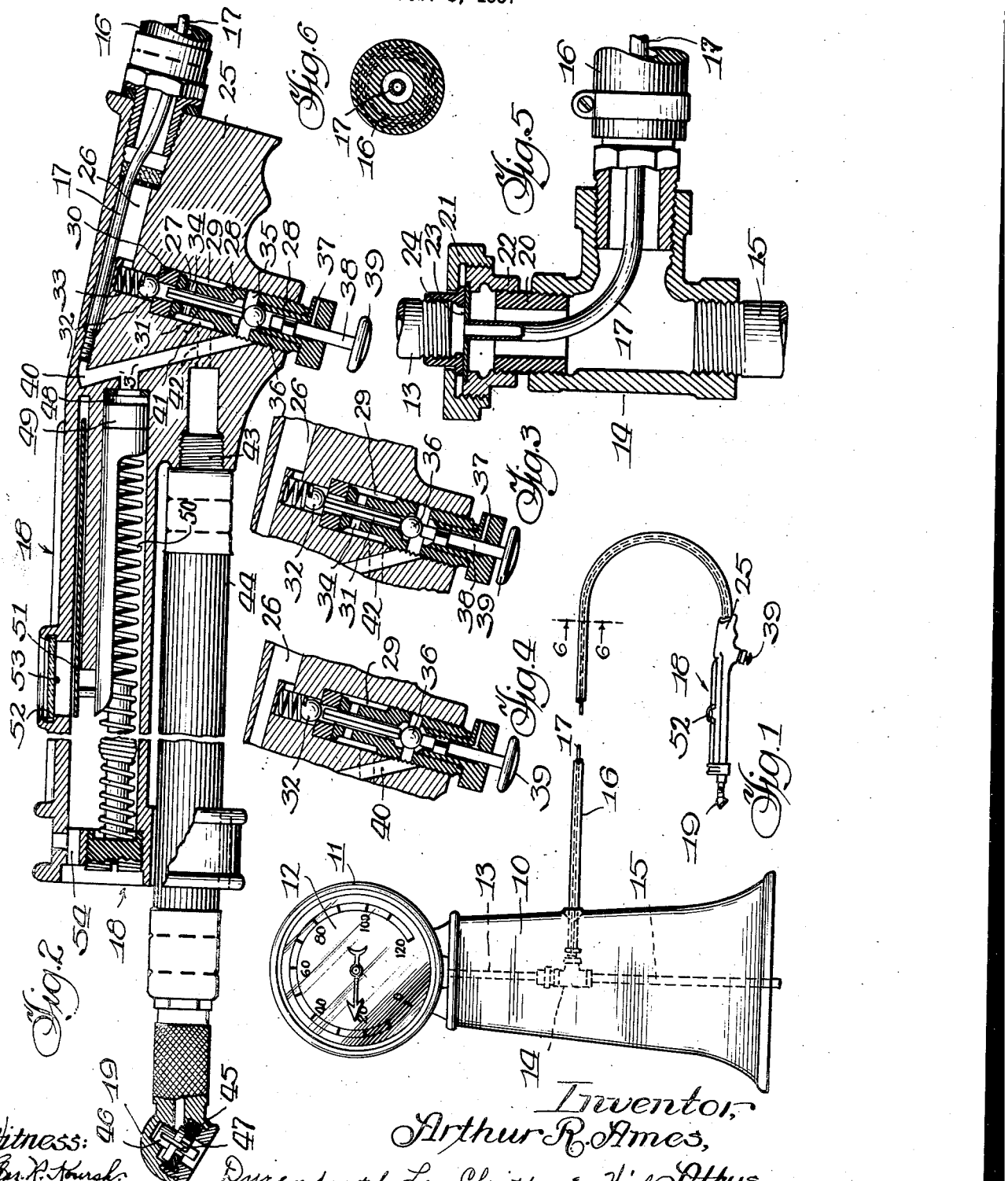
Inventor,
Arthur R. Ames,
Dyrenforth, Lee, Chritton & Wiles, Attys.

Patented Sept. 19, 1939

2,173,619

UNITED STATES PATENT OFFICE 2,173,619

TIRE INFLATING AND TESTING EQUIPMENT

Arthur R. Ames, Chicago, Ill., assignor to Ames Supply Company, Chicago, Ill., a corporation of Illinois Application February 8, 1937, Serial No. 124,792

4 Claims. (Cl. 137—69.5)

This invention relates to tire inflating and testing equipment.

Where tires are inflated by compressed air from a storage tank, such as is usually provided in garages and at gasoline filling stations, the attendant uses an air hose having a head or coupling, which is pressed over the projecting stem of the tire valve to unseat said valve and admit air. In some cases the head has an air gauge in it so that the attendant may read the pressure of the air in the tire, either before the additional compressed air is introduced therein or at any time during the inflation. However, the driver or any other occupant of the automobile cannot ordinarily see this small tire gauge or note the reading, unless he gets out of the car and stands near the attendant, or unless he inflates the tires himself.

Tires, as at present constructed, require that the pressure therein be retained within definite, predetermined limits, and considerable damage may result where the air pressure in the tires is allowed to become too low. The matter of proper inflation of the tires, therefore, is of even greater importance than heretofore. Also, it is very desirable that the car driver be informed as to what the pressure reading is in each tire before the inflation thereof is increased so that he may form some conclusion as to the time that he may safely allow to elapse before rechecking the pressure in his tires. With the added knowledge gained from fairly frequent readings, there is less danger of his neglecting to maintain the inflation within the desired limits.

The object of the present invention is to provide tire inflating and testing equipment which reduces the likelihood of neglecting to maintain the recommended pressure in the tires.

It has been proposed heretofore to provide a large gauge on a standard, in such position that it may be read from a distance, but having a hose extending from the tire stem coupling to the dial, of such internal diameter, as to result in a substantial drop in pressure as soon as said coupling is applied to the valve stem, thereby giving an inaccurate reading. It is an object of the present invention to provide a gauge which may be read from a distance but which is connected with the coupling by a tube of such small internal diameter that even with a substantial length of hose, there is substantially no pressure drop and as a result the reading is an accurate indication of the pressure that the tire would show just prior to the coupling operation.

Another object is to provide a tire gauge of this character in which there is an auxiliary or second gauge in the head, whereby the same pressure is indicated by both gauges.

Another object is to provide equipment of this character in which the tube leading from the coupling to the larger gauge, is enclosed within the tube or hose leading from the compressed air reservoir to said coupling, whereby the handling of a single tube only, is required.

An additional object is to provide inflating and testing equipment employing concentric tubes in which both of said tubes connect with the same coupling, whereby after pressing said coupling over the tire stem, the inflating operation, the pressure checking, and the operation of releasing air from the tire may be performed without removing said coupling.

A further object is to provide a coupling head or gauge housing of improved design, whereby the manipulation by the attendant of a plunger will enable said attendant to carry out all of the desired operations conveniently and quickly.

Other objects and advantages will be apparent from a consideration of the description which follows.

In the accompanying drawing, one embodiment of the invention has been illustrated.

Fig. 1 is an elevation of a standard having a gauge thereon and an air hose connection therefrom;

Fig. 2 is a section on a central plane through the small gauge housing, certain parts being shown in elevation;

Figs. 3 and 4 are fragmentary sections of a valve in two different positions;

Fig. 5 is an enlarged section on a vertical plane through a fitting in the standard; and Fig. 6 is a transverse section on an enlarged scale through the supply hose and the small pipe therefore, on line 6—6 of Fig. 1.

As shown in Fig. 1, a suitable standard 10 may be provided if it is desired to mount the gauge 11 in some convenient elevated position. This gauge is preferably larger than the coupling head gauge now employed and it may have any conventional or other suitable form of dial 12 as a part thereof. A suitable pipe 13 extends from the gauge to a fitting 14, which, as shown in Fig. 5, may have the form of a T, from the lower part of which extends another pipe 15, which is connected to the compressed air tank (not shown) or reservoir.

From one of the T connections extends a filling hose 16 of sufficiently large diameter to receive within it the pressure testing tube 17, and leave a substantial clearance between the two. These two tubes may be made of any suitable material. The outer one may be of reinforced or armored, flexible material, or of ordinary rubber-fabric similar to what is usually employed in conducting compressed air to automobile tires, and the inner one may be a small metal tube, as for example a copper tube, having an outer diameter only a fraction of that of the larger tube and having an inner diameter of about 54 thousandths of an inch or less. The inner diameter of the tube, however, may vary within reasonable limits, depending on the volume of the inner tube or other device being being inflated. With a large tire, for example, the diameter of said tube may be larger than where only bicycle tires are to be inflated.

At the end of the composite tube composed of the more or less concentric tubes 16 and 17 just described, is the head or valve housing indicated as a whole at 18. Said head has a connection with both tubes since, in the form shown, each tube has a screw threaded connection with the head, thus permitting said tubes to be screwed into place and to form a substantially air-tight connection with each of two independent ducts or chambers, hereinafter described more in detail. The head 18 has at the other end, an extension with a coupling 19 of conventional design, but with improved valve details.

The fitting 14, in the form shown in Fig. 5, has a threaded nipple 20 in its upper end over which is screwed a coupling comprising an outer coupling member 21 screwed over a lower coupling member 22, the latter having a shouldered recess in its upper face which receives a partition of thin material, such, for example, as a copper disc 23, in an opening in which the end of the copper tube 17 is secured to provide an air-tight joint. Said disc is clamped against the seat by a flanged fitting 24, which is held tightly in place by the outer coupling member 21. With this arrangement the compressed air delivered from the storage tank flows through the T joint or fitting without communicating with the interior of the pipe 17 or with the gauge with which said pipe is in open communication.

The housing 18 for the small gauge is provided preferably with a hand grip or handle 25. The outer tube 16 may be connected in a conventional manner with said handle and communicates with a passageway 26 therein, which in turn communicates with a transverse passage or bore 27. A threaded cylindrical plug or valve member 28 has screw threaded engagement with the wall of the cylindrical opening 27 and has its upper half shaped like a spool, i. e., with a reduced portion providing an annular clearance space 29 around said portion. On the upper end of said cylindrical member is a washer or sealing member 30 having a longitudinal opening therethrough in alignment with a longitudinal opening through said cylindrical member. A push rod or pin 31 is received within said aligned openings and is preferably of less diameter than said openings, being shown as a pin of square cross section to provide a clearance around it to permit the flow of incoming compressed air from the hose 16 to the coupling. The port in the washer 30 is normally closed by a ball 32, impelled toward its seat by a helical spring 33 and also held in place by the pressure of the air behind it, except when lifted from its seat by upward movement of the pin 31. The said reduced portion has a transverse opening 34 through the same so that when the ball is lifted from its seat, compressed air will flow through the port to the annular clearance space 29 around said reduced portion.

The cylindrical screw threaded plug 28 has a transverse opening 35 therethrough which intersects the longitudinal opening through said plug. Two valve seats are formed at this intersection, a lower one and an upper one. A ball 36 normally rests on the lower seat, thus closing the longitudinal port beneath it. Said valve controls the flow of air to the radial port or outlet 37 and is opened by upward movement of the plunger 38, which has a head 39, manipulated by hand, to lift the ball from its seat.

The small metal tube 17, as shown in Fig. 2, communicates with a transverse recess 40 in the handle, which latter communicates with the transverse port 35. This space or port is in open communication through the clearance space around the rod 31, with the annular clearance space 29 around the reduced portion or space, and hence communicates with the passageway 42 and with the stem 43 on the hose or tube 44 which communicates with the coupling 19. The latter has a resilient washer 45 therein having a central opening larger than the depending stem on the plunger 46, which is shaped as shown. On opposite sides of said plunger are longitudinal slots 47 which permit air to flow in or out of the coupling whether said plunger is in its inner or outer position. Said plunger has a variable inward movement, depending on the length of the valve stem in the tire valve and the washer or sealing member 45 seats against the end of said valve to provide an air-tight connection, as will be understood.

Before inflating a tire, the usual valve stem cap is unscrewed and the coupling 19 is pressed over the valve stem, whereupon the compressed air in the tire, i. e. the inner tube thereof, is put in open communication with the chamber 48, behind the plunger 49. The communication is through the tube 44, reduced stem 43, duct 42, the said annular clearance space 29, the transverse passage 34, downwardly through the clearance space around the rod 31, the duct 40, into the said space 48. The movement of the plunger 49 is resisted by the usual spring 50. The scale graduations appear on the slidable member 51 and are visible through the usual opening 52 beneath which is a cross-bar or cross-hair 53. The chamber within the gauge housing communicates with the outer air through the opening 54.

The duct 40 also communicates through the small metal tube 17 with the large gauge 11, as will be apparent. The volume within the tube 17 is comparatively small, and even when added to the clearance space of the several ducts just described and the volume of the space 48 behind the plunger, the total is relatively small, as compared to the volume of an ordinary inner tube when more or less inflated. Thus, as soon as the coupling 19 is pressed over the tire stem, a reading is obtained not only on the small gauge through the transparent panel 52, but a similar reading is obtained on the dial 12 of the large gauge 11. In view of the small volume in the communicating tubes and passages as just described, there is very little drop in the pressure indicated by the two gauges as compared with the actual pressure in the tire just prior to applying the coupling to the valve stem. The small gauge is readily observed by the attendant (as well as the large gauge) and the large gauge is readily observed by the occupants of the car. These two readings are obtained without any actuation of the valve stem or plunger 38, as will be apparent.

If the tire requires more air, the attendant, without removing the coupling, merely pushes in the plunger hard, or in other words, as far as it will go. This position is illustrated in Fig. 3 in which said plunger has lifted the lower ball 36 from its seat, causing said ball to close the port which is immediately above it. Said ball lifts the pin 31 and the latter lifts the upper ball 32 from its seat. Compressed air is thus admitted from the hose through the passageway 26, past the ball, through the transverse passageway 34, through the duct 42 and the extensions thereof to the coupling and into the tire. The compressed air, as it flows past the ball 32 and into the valve, is cut off from communication with the small gauge in the housing 18, by means of the lower ball 36 which is held manually against the upper of its two seats, as shown in said Fig. 3. The lower of the two ports, however, being open, the compressed air in the valve chamber 48 is released through the outlet or port 37.

As the tire is being inflated, the pressure therein may be determined at any time by releasing the plunger, whereupon it returns to its Fig. 2 position in which the coupling is in communication with the small tube and also with the two gauges. If more pressure is required, the plunger is again pushed in hard for a short period and these operations are repeated, if necessary, until the exact desired pressure is indicated. This exact desired pressure is attained in this manner more or less accidentally and usually, after successive manipulation, the gauge shows a higher pressure than that desired, whereupon the attendant pushes in the plunger only part way, as shown in Fig. 4, releasing the compressed air from behind the plunger 49, by reason of the fact that the lower ball 36 has been lifted off its seat. It is not lifted high enough, however, to lift the pin 31 and the upper ball 32, which latter therefore keeps the upper port closed. The gauge reading decreases as the air is escaping and the operator releases the plunger as the desired pressure is reached, thus establishing the Fig. 2 position of the valves. If, however, the pressure drops below the desired point, even though the plunger is released quickly, it is necessary to again push the plunger all the way in to raise the pressure and possibly release it momentarily again. In this manner the exact reading is attained. The manipulations, however, are performed very quickly and as a result the desired inflation, and particularly the final steps in attaining the same, are performed with very little loss of time, and in less time than with the usual equipment.

It will be seen that the structure described provides an air passageway from the coupling 19 to the annular clearance space 29 around the reduced portion. The air flows through this passageway in one direction in inflating the tire and in the opposite direction in testing the pressure in the same. This passageway divides, however, at the transverse port 34, one branch extending upwardly to the hose and the other branch extending downwardly to the small gauge chamber and to the small tube. The tubes provide parallel ducts through which ducts, however, the air flows, generally speaking, in opposite directions, i. e., it flows toward the coupling in the large hose and away from the coupling in the small tube, (i. e., toward the large gauge) except when said air is being released. The two ball valves serve the purpose of cutting off communication between the large tube and the coupling when it is desired to have the small tube in open communication therewith, and, conversely, communication through the small tube is cut off when the large tube is in open communication with the coupling. The lower valve also serves to release the compressed air in the small gauge.

It will be understood that the invention may be embodied in various different forms, the one described herein in detail being presented merely as illustrative of the field of usefulness of the same.

I claim:

1. Tire inflating and testing equipment comprising, a pliable tube for compressed air connected at one end to a reservoir, a smaller pliable tube therein, a gauge structure, having an indicator therein, to which structure one end of each of said tubes is connected, a coupling connected through ducts in said gauge structure with said tubes, the other end of said smaller tube being connected to another gauge visible to the car occupant, the volume of said smaller tube being slight as compared to the volume of the tire to be inflated, whereby both gauges give substantially the same reading without material pressure drop after the tire is connected to said tubes, the other end of the larger tube being connected to a source of compressed air.

2. Equipment of the class described comprising, a base, a gauge thereon, a pipe leading from said gauge to a fitting in said base, another pipe leading from said fitting to a compressed air reservoir, and two tubes leading from said fitting through said base, one of said tubes being contained in the other, and a coupling at the end of said tubes whereby the same coupling may be used to test the pressure in a tire by means of the smaller of the two tubes and to inflate said tire by means of the larger of said two tubes.

3. A device of the class described comprising, a housing, tubes connected therewith in concentric relation, the larger of which is connected also to a fitting, communicating with a compressed air reservoir, and the smaller of which is connected to a pressure gauge through a wall of said fitting and is concealed within said larger tube from said housing to said fitting, said housing having a valve chamber therein, a valve therein comprising three fixed seats, a ball between two of said seats and adapted to seat against either one, and an additional ball engaging the third seat, a plunger for moving the first mentioned ball from one of said seats against its other seat, and a pin actuated by movement of said first ball to move said second ball from its seat, and ducts leading from said valve chamber to said tubes.

4. Inflating and pressure testing equipment comprising a fluid pressure hose connected at one end to a supply of fluid under pressure, a coupling at the other end for the article to be inflated, said coupling having chambers therein, a pressure indicating gauge mounted in a position to be observed readily, and a tube of smaller diameter than said hose, connected at one end with said coupling and at the other end with said gauge, said tube passing through said hose and concealed therein, the ratio of the volume of said tube to the volume of said article to be inflated, being small, said tube and hose each having a connection with said coupling and communicating with said chambers therein.

ARTHUR R. AMES.